United States Patent
Kuffel

Patent Number: 5,472,159
Date of Patent: Dec. 5, 1995

[54] BUTTONMOUNT

[75] Inventor: Gregory L. Kuffel, Shaumburg, Ill.

[73] Assignee: Panduit Corp., Tinley Park, Ill.

[21] Appl. No.: 33,698

[22] Filed: Mar. 16, 1993

[51] Int. Cl.$^6$ ............................................. F16L 3/00
[52] U.S. Cl. .................. 248/71; 248/68.1; 248/224.8; 24/458
[58] Field of Search ................... 248/73, 71, 69, 248/220.3, 221.4, 231.9, 74.3, 68.1, 224.4, 69, 74.4, 505, 58, 60; 24/16 PB, 17 B, 16 R, 458, 339, 336

[56] References Cited

U.S. PATENT DOCUMENTS

| | | | |
|---|---|---|---|
| Re. 22,564 | 11/1944 | Murphy | 248/73 X |
| D. 247,801 | 5/1978 | Bulanda et al. | |
| 2,618,033 | 11/1952 | Tinnerman et al. | 248/68.1 |
| 3,087,700 | 4/1963 | Carpenter et al. | |
| 3,143,325 | 8/1964 | Carpenter et al. | 248/68.1 |
| 3,259,347 | 7/1966 | Yates | 248/73 |
| 3,632,070 | 1/1972 | Thayer | 248/68.1 |
| 3,632,071 | 1/1972 | Cameron et al. | |
| 3,667,710 | 6/1972 | Moody et al. | 248/73 |
| 3,944,177 | 3/1976 | Yoda | |
| 4,356,987 | 11/1982 | Schmid | 248/73 |
| 4,395,009 | 7/1983 | Bormke | 248/68.1 |
| 4,397,436 | 8/1983 | Lyon et al. | 248/74.3 X |
| 4,632,343 | 12/1986 | Watanabe | 248/73 |
| 4,638,966 | 1/1987 | Ford | 248/74.3 X |
| 4,700,913 | 10/1987 | Hirano et al. | |
| 5,042,114 | 8/1991 | Parrish | 248/74.3 X |

Primary Examiner—Karen J. Chotkowski
Attorney, Agent, or Firm—Charles R. Wentzel; Mark D. Hilliard; Robert A. McCann

[57] ABSTRACT

An integrally formed mount member is provided for mounting a bundle of wires that are secured by a metal cable tie that includes flange portions for retaining the mount to one side of a mounting surface and for providing engagement with a cable tie strap on the opposite side of the mounting surface.

20 Claims, 3 Drawing Sheets

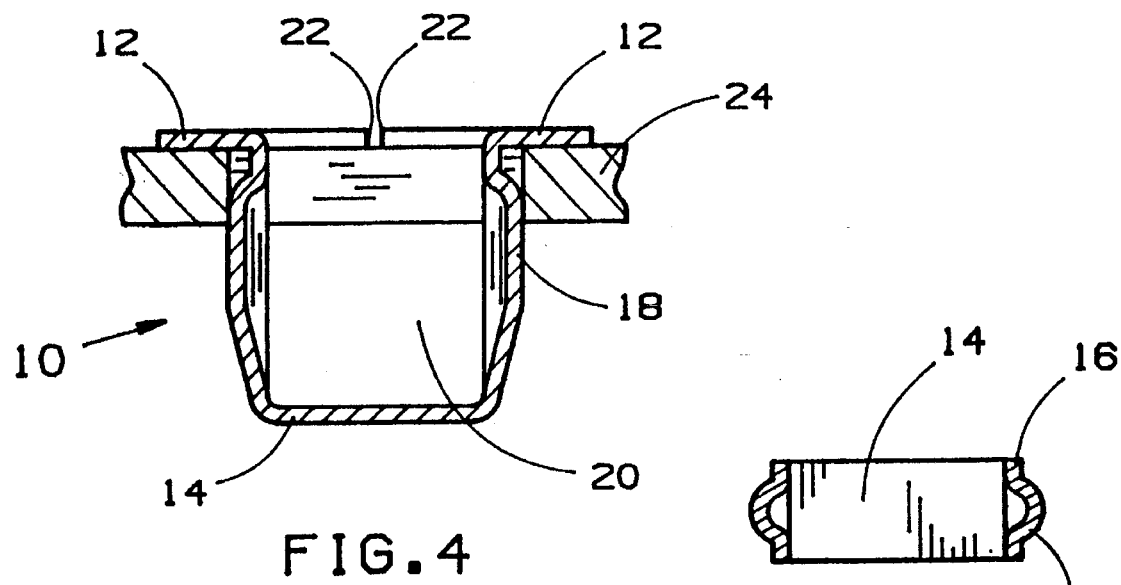
FIG.4
FIG.5
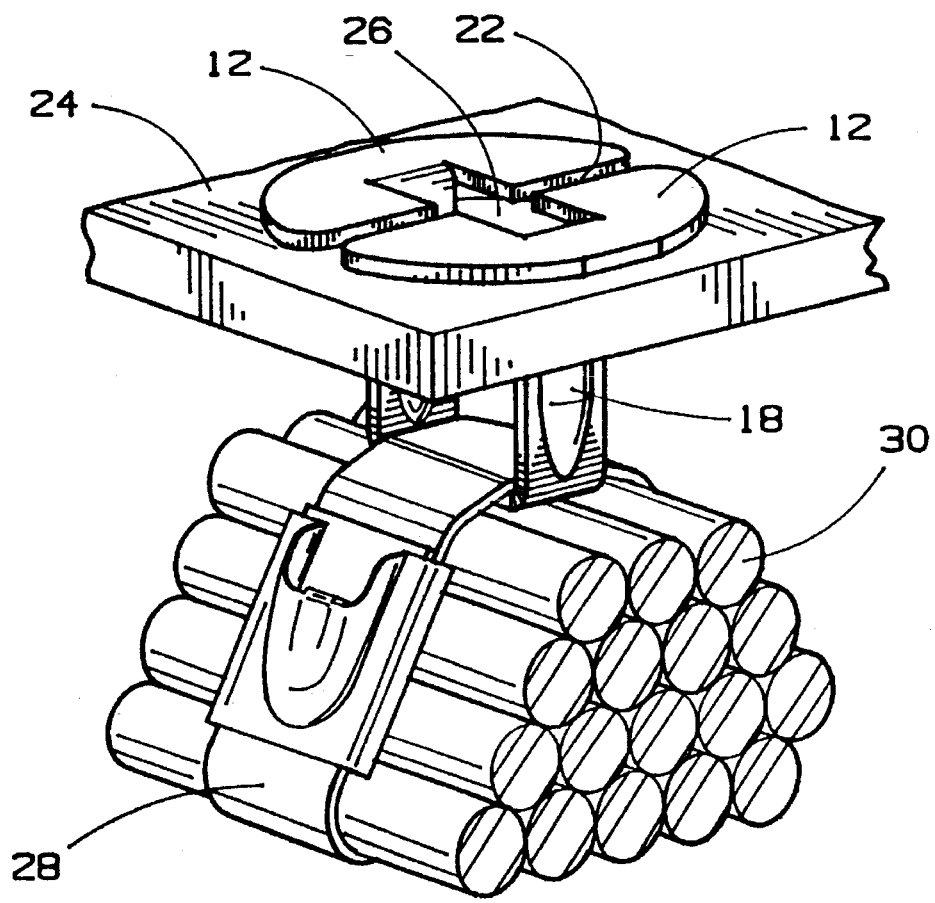
FIG.6

BUTTONMOUNT

TECHNICAL FIELD

The present invention relates to an improved mount for mounting a bundle of wires, or the like, that are secured by a cable tie to a mounting surface, and more specifically to an improved buttonmount that can be inserted into a hole and retained on one side of the mounting surface and provide a cable tie strap engaging support on the opposite side of the mounting surface for securing a bundle of wires.

BACKGROUND OF THE INVENTION

In the electrical industry today there are a wide variety of applications for mounts that secure bundles of wires contained by a cable tie to a mounting surface. In many instances the user has access to both sides of the mounting surface, and it is advantageous to utilize a mount that can be inserted into a hole from one side of the mounting surface and which provides a cable tie strap engaging support on the other side of the mounting surface.

Also, in the electrical industry today, there is an increasing use of metal cable ties to secure bundles of wires and the like. This increase in applications that require the particular characteristics and advantages of metal cable ties for securing bundles has resulted in a demand for mounts that can be used in connection with metal cable ties.

SUMMARY OF THE INVENTION

It is therefore an object of the present invention to provide a mount that can be used to mount a bundle of wires that is secured by a metal cable to a mounting surface.

It is another object of the present invention to provide a mount which can be used in conjunction with metal cable tie applications that is simple and inexpensive to manufacture.

It is still further an object of the present invention to provide a mount that can be inserted into a hole on one side of the mounting surface to provide a cable tie strap passageway and support on the opposite side of the mounting surface.

In general a buttonmount includes a mount member having a pair of spaced apart resilient legs for insertion into a hole in a mounting surface, flange means disposed at a trailing end of the mount member for abutting against the mounting surface to prevent the mount member from passing completely through the hole of the mounting surface, and strap engagement means provided on a leading end of the mount member for engagement with a cable tie strap that is secured around a bundle of wires.

BRIEF DESCRIPTION OF THE DRAWINGS

FIG. 4 is a front sectional view of the mount of FIG. 1 inserted into a hole in a mounting surface;

FIG. 5 is a sectional plan view of the mount of FIG. taken along line 5—5 of FIG. 3;

FIG. 6 is a perspective view of the mount shown securing a bundle of wires to a mounting surface;

DESCRIPTION OF THE PREFERRED EMBODIMENT

Figure 1:
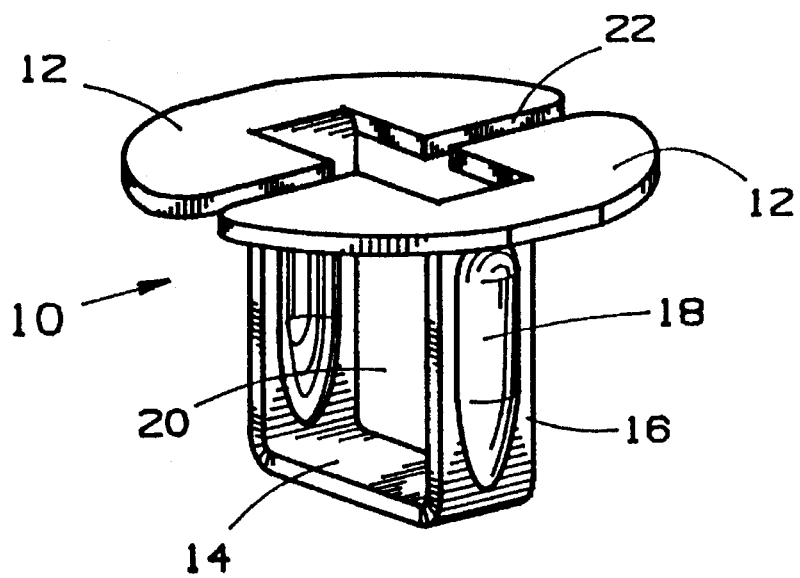
FIG. 1 is a perspective view of a mount embodying the concept of the present invention.
Figure 2:
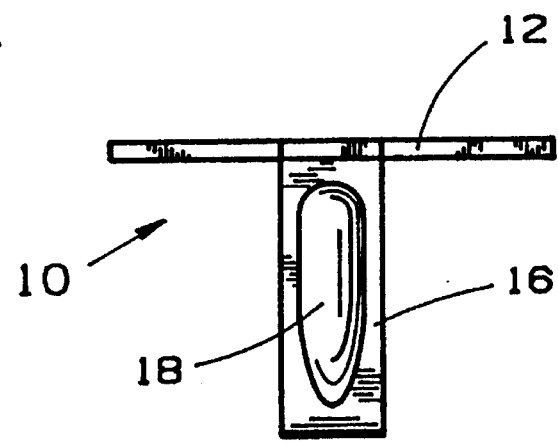
FIG. 2 is a side view of the mount of FIG. 1.
Figure 3:
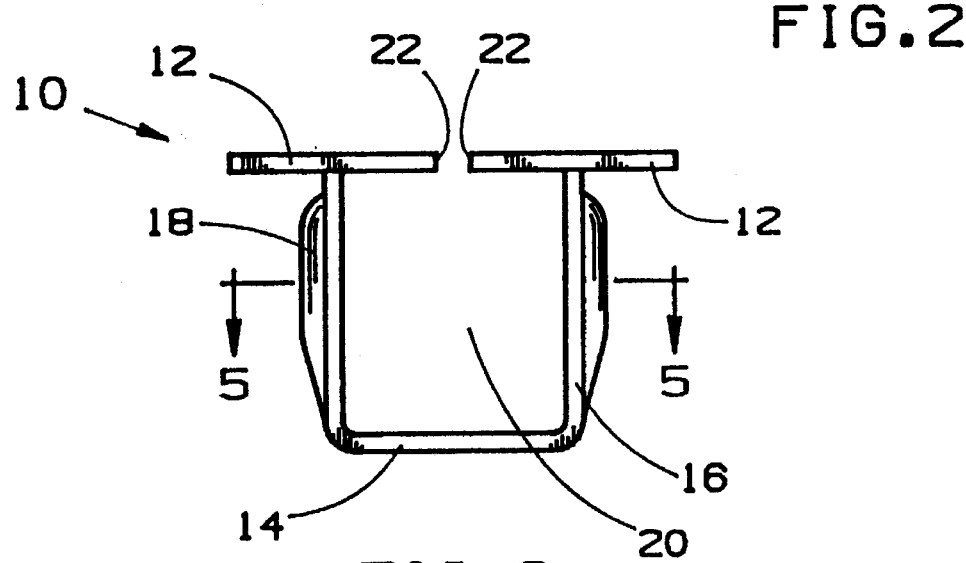
FIG. 3 is a front view of the mount of FIG. 1.
Figure 7:
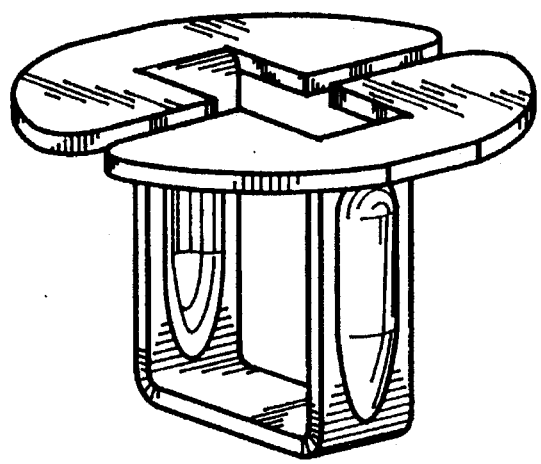
FIG. 7 is a perspective view of the mount illustrating our new design.
Figure 8:
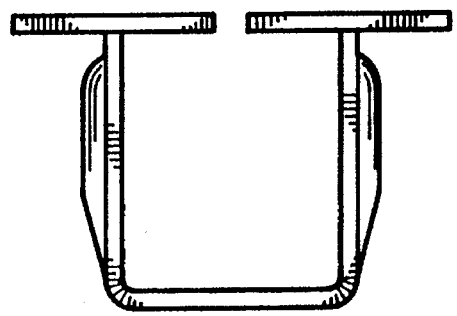
FIG. 8 is a front view of the mount of FIG. 7.
Figure 9:
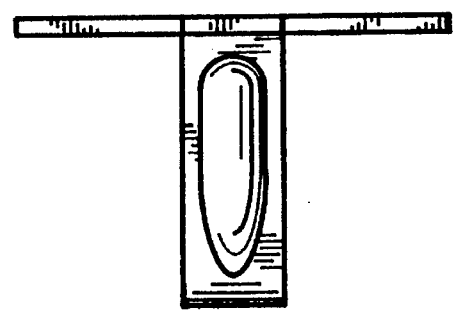
FIG. 9 is a side view of the mount of FIG. 7.
Figure 10:
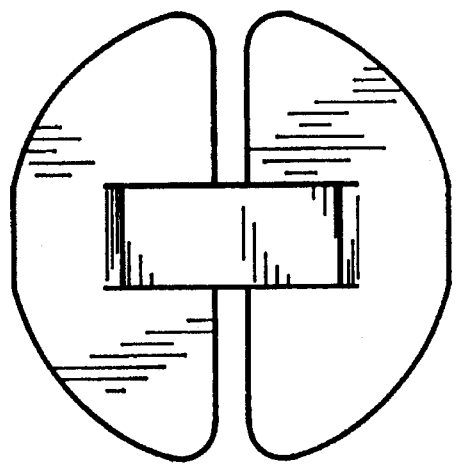
FIG. 10 is a top view of the mount of FIG. 7.
Figure 11:
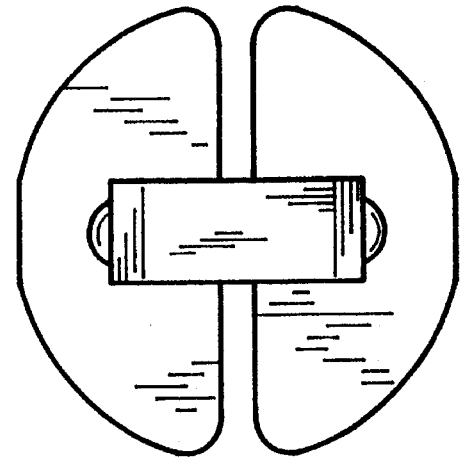
FIG. 11 is a bottom view of the mount of FIG. 7.

A buttonmount embodying the concept of the present invention is designated generally by the reference numeral 10 in the accompanying drawings. Mount 10 is formed by sheet metal stamping of a unitary piece of metal such as stainless steel. As shown in FIG. 3, mount 10 includes a pair of spaced apart resilient retention legs 16 which are coupled together by a perpendicular strap support 14 situated at one end of, and in between, the legs 16 to form a generally U-shaped mount 10. Each leg 16 also includes at the end opposite the strap support 14 a flanged head member 12 integrally formed and perpendicular to legs 16 of mount 10. As shown in FIG. 4, mount 10 is inserted into a hole 26 of the mounting surface 24 with the end of mount 10 with legs 16 coupled by strap support 14 being the leading end. Flanged heads 12 are formed on a trailing end so as to be sufficiently larger than hole 26 so that mount 10 is prevented from passing completely through hole 26 by flanged heads 12 abutting mounting surface 24 around hole 26. Legs 16 should be of a sufficient length to allow the strap support 14 to be accessible to a cable tie 28 at the opposite side of mounting surface 24 when mount 10 has been fully inserted into hole 26.

As shown in FIGS. 3 and 5, legs 16 also include retaining bumps 18 formed on the outside of each leg 16. Retaining bumps 18 are formed as tubular protrusions which extend axially along each leg 16. As can best be seen in FIG. 3, retaining bumps 18 are tapered near the leading end of legs 16 which are inserted into the hole 26 of mounting surface 24. The insertion of mount 10 into hole 26 is eased by the tapered leading ends of retaining bumps 18. As can be seen in FIG. 4, legs 16 flex slightly inward due to their resiliency as mount 10 is pushed into hole 26 and retaining bumps 18 create a press fit with hole 26 of mounting surface 24. Flanged heads 12 are further formed to have opposing shoulder surfaces 22 which abut each other to prevent legs 16 from flexing inwardly too far and resulting in collapse of mount 10 during insertion.

After mount 10 has been fully inserted with flanged heads 12 abutting mounting surface 24 and retaining bumps 18 creating a press fit with hole 26, cable tie 28 can be passed through a passageway 20 and secured around a bundle 30 and strap support 14 to effectively mount bundle 30 against mounting surface 24.

While the particular embodiment of the present invention has been shown and described. It will be obvious to those skilled in the art that changes and modifications may be made without departing from the invention in its broader aspects. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A buttonmount formed from a single piece of sheet metal, for use in securing a bundle of objects to a mounting surface having a hole, comprising:

a mount member having a leading end including a pair of spaced apart resilient legs for insertion from a first side of the mounting surface into the hole in the mounting surface;

flange means disposed at a trailing end of the mount member opposite the leading end for abutting against the first side of the mounting surface to prevent the mount member from passing completely through the hole of the mounting surface; and strap engagement means provided on the leading end of the mount member for engagement with a cable tie strap on a second side of the mounting surface that is secured around a bundle of objects such that the bundle is secured on the second side of the mounting surface.

2. A buttonmount according to claim 1, wherein the resilient legs include retaining bumps formed on the exterior of the legs to create a press fit with the hole of the mounting surface.

3. A buttonmount according to claim 2, wherein the flange means includes a pair of spaced apart flanged head portions formed perpendicular to the legs so that one of the flanged heads is disposed at the trailing end of each of the legs.

4. A buttonmount according to claim 3, wherein the flanged head portions further include opposing shoulder surfaces which can abut each other to prevent collapse of the mount member.

5. A buttonmount according to claim 4, wherein the flanged head portions are formed as semi-circular shaped discs.

6. A buttonmount according to claim 5, wherein the strap engagement means includes a strap support situated perpendicular to the leading end of the legs.

7. A buttonmount according to claim 6, wherein the retaining bumps are formed as tubular protrusions extending axially to the legs.

8. A buttonmount according to claim 7, wherein the tubular protrusions further include a tapered leading end to ease insertion of the mount member into the hole of the mounting surface.

9. A buttonmount according to claim 8, wherein the legs are of a sufficient length to have the strap support extend through the hole of the mounting surface when the flanged heads are abutting the leading insertion side of the mounting surface.

10. A buttonmount according to claim 9, wherein the mount member is integrally formed.

11. A buttonmount according to claim 10 wherein the mount member is formed of stainless steel.

12. A buttonmount comprising:

a mount member that includes a pair of spaced apart resilient legs having a leading end jointed by a strap engaging portion at the leading end for insertion into a hole of a mounting surface; and a flanged head disposed at a trailing distal end of each of the legs; wherein the mount member includes a retaining bump formed on the outside of each leg for creating a press fit with the hole of the mounting surface.

13. A buttonmount according to claim 12, wherein the retaining bumps are formed as tubular protrusions extending axially to the legs.

14. A buttonmount according to claim 13, wherein the tubular protrusions further include a tapered leading end to ease insertion of the mount member into the hole of the mounting surface.

15. A buttonmount according to claim 14, wherein the strap engaging portion is a strap support disposed perpendicularly to and between the legs of the mount member.

16. A buttonmount according to claim 12 wherein the flanged heads are spaced apart from each other and perpendicular to the legs of the mount member.

17. A buttonmount according to claim 16, wherein the flanged heads include opposing shoulder surfaces which abut each other to prevent collapse of the mount member.

18. A buttonmount according to claim 17, wherein the flanged heads are formed generally as semi-circular shaped disc portions.

19. A buttonmount according to claim 18, wherein the mount member is integrally formed.

20. A buttonmount according to claim 19, wherein the mount member is formed of stainless steel.

* * * * *